(12) United States Patent
Hager et al.

(10) Patent No.: US 7,394,383 B2
(45) Date of Patent: Jul. 1, 2008

(54) CLOSURE FOR A CONTAINER

(75) Inventors: Garrett Hager, Lancaster, PA (US); William Conard, Harleysville, PA (US); Jon Huffer, Williamsport, PA (US); Earle C. Keirstead, Gulfport, FL (US); Eugene T. Polini, III, Mont Clare, PA (US)

(73) Assignee: West Pharmaceutical Services, Inc., Lionville, PA (US)

( * ) Notice: Subject to any disclaimer, the term of this patent is extended or adjusted under 35 U.S.C. 154(b) by 184 days.

(21) Appl. No.: 11/244,642

(22) Filed: Oct. 6, 2005

(65) Prior Publication Data
US 2006/0092013 A1    May 4, 2006

Related U.S. Application Data

(60) Provisional application No. 60/616,809, filed on Oct. 7, 2004.

(51) Int. Cl.
*G08B 13/14* (2006.01)
(52) U.S. Cl. .............. 340/572.8; 340/572.1; 340/691.6; 215/230
(58) Field of Classification Search .............. 340/572.8, 340/539.1, 691.1, 691.6, 815.4, 815.49, 572.1; 206/459.5; 604/445, 404, 415; 215/247, 215/230, 206, 200, 203; 53/52, 505, 507, 53/508; 428/212
See application file for complete search history.

(56) References Cited

U.S. PATENT DOCUMENTS

| | | | |
|---|---|---|---|
| 3,589,280 A | 6/1971 | Wilde | |
| 3,628,271 A * | 12/1971 | Carrell et al. .................. | 40/311 |
| 3,899,295 A | 8/1975 | Halpern | |
| 4,449,042 A | 5/1984 | Hampson et al. | |
| 4,493,989 A | 1/1985 | Hampson et al. | |
| 5,018,632 A | 5/1991 | Schmidt | |
| 5,152,413 A | 10/1992 | Conrad | |
| 5,255,819 A | 10/1993 | Peckels | |
| 5,270,717 A | 12/1993 | Schuermann | |
| 5,318,197 A | 6/1994 | Martindale et al. | |
| 5,374,930 A | 12/1994 | Schuermann | |
| 5,377,853 A * | 1/1995 | Papciak ...................... | 215/230 |
| 5,379,916 A | 1/1995 | Martindale et al. | |
| 5,448,242 A | 9/1995 | Sharpe et al. | |
| 5,451,958 A | 9/1995 | Schuermann | |
| 5,479,171 A | 12/1995 | Schuermann | |
| 5,500,651 A | 3/1996 | Schuermann | |
| 5,531,344 A | 7/1996 | Winner | |
| 5,541,604 A | 7/1996 | Meier | |
| 5,543,798 A | 8/1996 | Schuermann | |
| 5,565,846 A | 10/1996 | Geiszler et al. | |
| 5,594,448 A | 1/1997 | d'Hont | |
| 5,602,919 A | 2/1997 | Hurta et al. | |

(Continued)

OTHER PUBLICATIONS

International Search Report for the corresponding International Patent Application No. PCT/US05/35902; Date of Mailing Apr. 9, 2007.

*Primary Examiner*—Toan N. Pham
(74) *Attorney, Agent, or Firm*—Panitch Schwarze Belisario & Nadel LLP (57) ABSTRACT

A closure for a container is disclosed. The closure includes a cap seal and an overcap removably fastened to the cap seal, where the overcap includes a decorated film fused into a top surface of the overcap.

32 Claims, 6 Drawing Sheets

U.S. PATENT DOCUMENTS

| | | | |
|---|---|---|---|
| 5,603,430 | A | 2/1997 | Loehrke et al. |
| 5,619,207 | A | 4/1997 | d'Hont |
| 5,621,411 | A | 4/1997 | Hagl et al. |
| 5,629,981 | A | 5/1997 | Nerlikar |
| 5,708,419 | A | 1/1998 | Isaacson et al. |
| 5,745,036 | A | 4/1998 | Clare |
| 5,852,590 | A | 12/1998 | de la Huerga |
| 5,883,582 | A | 3/1999 | Bowers et al. |
| 5,929,801 | A | 7/1999 | Aslanidis et al. |
| 5,955,950 | A | 9/1999 | Gallagher, III et al. |
| 5,955,969 | A | 9/1999 | D'Hont |
| 5,957,313 | A | 9/1999 | Bouan |
| 5,959,531 | A | 9/1999 | Gallagher, III et al. |
| 5,963,134 | A | 10/1999 | Bowers et al. |
| 5,970,148 | A | 10/1999 | Meier |
| 6,025,780 | A | 2/2000 | Bowers et al. |
| 6,036,055 | A | 3/2000 | Mogadam et al. |
| 6,040,565 | A | 3/2000 | Akerlind |
| 6,072,383 | A | 6/2000 | Gallagher, III et al. |
| 6,166,706 | A | 12/2000 | Gallagher, III et al. |
| 6,195,006 | B1 | 2/2001 | Bowers et al. |
| 6,208,235 | B1 | 3/2001 | Trontelj |
| 6,226,619 | B1 | 5/2001 | Halperin et al. |
| 6,259,654 | B1 | 7/2001 | de la Huerga |
| 6,259,794 | B1 | 7/2001 | Dobbins |
| 6,271,753 | B1 | 8/2001 | Shukla |
| 6,313,747 | B2 | 11/2001 | Imaichi et al. |
| 6,325,244 | B2 | 12/2001 | Vincent et al. |
| 6,354,468 | B1 | 3/2002 | Riek |
| 6,380,858 | B1 | 4/2002 | Yarin et al. |
| 6,416,152 | B1 | 7/2002 | Matsuzaki et al. |
| 6,491,217 | B2 | 12/2002 | Catan |
| 6,505,780 | B1 | 1/2003 | Yassin et al. |
| 6,520,544 | B1 | 2/2003 | Mitchell et al. |
| 6,527,181 | B1 | 3/2003 | Kleeberg et al. |
| 6,529,446 | B1 | 3/2003 | de la Huerga |
| 6,544,634 | B1 | 4/2003 | Abrams |
| 6,574,166 | B2 | 6/2003 | Niemiec |
| 6,604,650 | B2 | 8/2003 | Sagar |
| 6,616,047 | B2 | 9/2003 | Catan |
| 6,641,052 | B2 | 11/2003 | Baillod et al. |
| 6,676,014 | B2 | 1/2004 | Catan |
| 6,677,917 | B2 | 1/2004 | Van Heerden et al. |
| 6,693,539 | B2 | 2/2004 | Bowers et al. |
| 6,751,730 | B1 | 6/2004 | Walker et al. |
| 6,758,397 | B2 | 7/2004 | Catan |
| 6,779,024 | B2 | 8/2004 | DeLaHuerga |
| 6,782,601 | B2 | 8/2004 | Smeyak et al. |
| 6,793,127 | B2 | 9/2004 | Alsafadi et al. |
| 6,859,745 | B2 | 2/2005 | Carr et al. |
| 6,879,876 | B2 * | 4/2005 | O'Dougherty et al. ...... 700/231 |
| 7,098,794 | B2 * | 8/2006 | Lindsay et al. ........... 340/572.3 |
| 7,112,356 | B2 * | 9/2006 | Nomula et al. ............. 428/34.2 |
| 7,166,154 | B2 | 1/2007 | Barreto |
| 2001/0014377 | A1 | 8/2001 | Babb et al. |
| 2001/0017817 | A1 | 8/2001 | De La Huerga |
| 2001/0021356 | A1 | 9/2001 | Konrad |
| 2001/0028308 | A1 | 10/2001 | De La Huerga |
| 2002/0039909 | A1 | 4/2002 | Rankin |
| 2002/0067270 | A1 | 6/2002 | Yarin et al. |
| 2002/0076819 | A1 | 6/2002 | Bowman et al. |
| 2002/0093427 | A1 | 7/2002 | Roth et al. |
| 2002/0116996 | A1 | 8/2002 | Malzahn |
| 2002/0147629 | A1 | 10/2002 | Alsafadi et al. |
| 2002/0161652 | A1 | 10/2002 | Paullin et al. |
| 2002/0169635 | A1 | 11/2002 | Shillingburg |
| 2002/0188259 | A1 | 12/2002 | Hickle et al. |
| 2002/0189667 | A1 | 12/2002 | O'Dougherty et al. |
| 2003/0004608 | A1 | 1/2003 | O'Dougherty et al. |
| 2003/0007421 | A1 | 1/2003 | Niemiec et al. |
| 2003/0011476 | A1 | 1/2003 | Godfrey |
| 2003/0020613 | A1 | 1/2003 | Cosnard |
| 2003/0023974 | A1 | 1/2003 | Dagtas et al. |
| 2003/0037872 | A1 | 2/2003 | Duschek |
| 2003/0043039 | A1 | 3/2003 | Salemi et al. |
| 2003/0047530 | A1 | 3/2003 | Durbin |
| 2003/0055589 | A1 | 3/2003 | Mogadam |
| 2003/0057276 | A1 | 3/2003 | Appalucci et al. |
| 2003/0061706 | A1 | 4/2003 | Smeyak et al. |
| 2003/0080901 | A1 | 5/2003 | Piotrowski |
| 2003/0085267 | A1 | 5/2003 | Piotrowski et al. |
| 2003/0086338 | A1 | 5/2003 | Sastry et al. |
| 2003/0088496 | A1 | 5/2003 | Piotrowski |
| 2003/0095253 | A1 | 5/2003 | Chow |
| 2003/0099158 | A1 | 5/2003 | De la Huerga |
| 2003/0105729 | A1 | 6/2003 | Waxler |
| 2003/0120607 | A1 | 6/2003 | Piotrowski |
| 2003/0129283 | A1 | 7/2003 | Martinez Carballido |
| 2003/0136801 | A1 | 7/2003 | Garcia et al. |
| 2003/0174046 | A1 | 9/2003 | Abrams |
| 2003/0174554 | A1 | 9/2003 | Dunstone et al. |
| 2003/0183226 | A1 | 10/2003 | Brand et al. |
| 2003/0235027 | A1 | 12/2003 | Smeyak et al. |
| 2004/0008123 | A1 | 1/2004 | Carrender et al. |
| 2004/0021751 | A1 | 2/2004 | Steinmetz et al. |
| 2004/0027180 | A1 | 2/2004 | Usami |
| 2004/0100415 | A1 | 5/2004 | Veitch et al. |
| 2004/0117062 | A1 | 6/2004 | Bonney et al. |
| 2004/0133305 | A1 | 7/2004 | Jean-Pierre |
| 2004/0152202 | A1 | 8/2004 | Van der Maas et al. |
| 2004/0172160 | A1 | 9/2004 | O'Dougherty et al. |
| 2004/0193446 | A1 | 9/2004 | Mayer et al. |

* cited by examiner

CLOSURE FOR A CONTAINER

CROSS-REFERENCE TO RELATED APPLICATIONS

This application is a Non-Provisional of Provisional Application No. 60/616,809, entitled "In-Mold Decorated Flip-Off Button", filed Oct. 7, 2004, the contents of which are incorporated herein by reference in their entirety.

FIELD OF THE INVENTION

The present invention is directed to a closure for a container and more specifically, to a closure for a medicament container, including removable overcap containing information related to the container and/or the contents of the container.

BACKGROUND OF THE INVENTION

Liquid pharmaceutical products for application to a patient by a syringe are typically packaged in containers which are sealed with a stopper inserted into a neck of the container. A metallic cap seal is typically applied over the exterior opening of the neck to cover the end of the rubber stopper. The cap seal is secured to the neck by crimping the cap seal around a shoulder of the neck. The cap seal includes a small diameter hole at its center, facilitating the insertion of a needle of the syringe into the container. Limited amounts of information about the product may be imprinted on the cap seal.

A removable overcap is sometimes attached over the cap seal. The overcap may display limited amounts of product information such as the container's contents, brand name, dosage or strength of the medication in the container. The mechanism for attaching the overcap to the cap seal is expressly designed to be altered when the overcap removed from the cap seal, thus preventing replacement of the overcap on the cap seal. Consequently, the absence of the overcap on a container is a positive indication that access to the medicament or tampering of the container has been attempted. Such an overcap is described in U.S. Pat. No. 5,377,853.

The process of preparing containers of medicaments for shipment to a distributor typically includes steps of: (1) sterilizing an empty container, (2) filling the container with a medicament, (3) placing the rubber stopper in the neck of the container, (4) attaching the overcap to the cap seal, (5) sealing the end of the container with the cap seal/overcap assembly, (6) sterilizing the sealed container and (7) labeling the container with the contents of the container and other information related to the manufacturing history.

Particularly in the case of containers holding medicaments, it is of the utmost importance that the information on the labeling of each container correspond to the actual contents of the container and include such information that allows for traceability of the contents to the history of manufacture. Thus, information should ideally be associated with each filled container from near the moment that the container is filled.

Presently, however, it is not possible to include with each container at the time of filling, all of the required information on the container contents and on manufacturing the container contents, since labeling applied to the container at the time of filling would not survive the autoclaving step following filling, and there is insufficient room on the cap seal and/or on the overcap to include all of the required information. Further, the destination for each filled container is not known at the time the container is filled. Since the minimum information to be applied to a label is generally prescribed by law, and such laws vary from country to country, the labeling of containers can not be done until the destination of a particular lot of containers is determined. Such determination may not be made until after a specific lot of the containers has been shelved for a period of time. In order to reliably determine the contents of the containers in a lot that has been shelved, samples from each lot are generally taken from the shelved lot and the contents of the samples determined analytically prior to labeling. Such a procedure is time consuming and expensive.

A further problem associated with labeling of the containers is one of counterfeiting. Such counterfeiting may utilize packaging and labeling identical to legitimate articles such that even an experienced end user pharmacist or medical practitioner is unable distinguish the counterfeit article from the legitimate article.

Accordingly, there is a need for a method of tagging a container of medicament with information which provides: (1) a high level of confidence that the labeling on a container reflects the actual contents of the container, and (2) a high level of confidence that the container was filled by the manufacturer identified on the label. Preferably, the method of tagging would allow for the tagging to be applied substantially concurrently with the filling of the container with medicament such that sampling of the containers in a shelved lot would be unnecessary. Preferably, the method of tagging would also provide for storing information related to not only the container contents, but also information related to packaging and distribution of the individual containers.

BRIEF SUMMARY OF THE INVENTION

Briefly stated, the present invention provides a closure for a container comprising a cap seal, and an overcap removably fastened to the cap seal, where the overcap includes a decorated film fused into a top surface.

In another aspect of the invention, the present invention provides an overcap for a container comprising a button-like member having a generally flat top surface and a decorated film fused into the top surface where the decorated film includes at least one image on a top side of the decorated film.

A further aspect of the invention includes a method of fabricating an overcap for a container comprising the steps of: forming a plurality of arrangements of at least one image on a top side of a substrate; attaching a plurality of memory devices on a bottom side of the substrate such that the plurality of arrangements and the plurality of memory devices are aligned; removing each one of the aligned arrangements and the memory devices from the substrate to form a plurality of decorated films; forming a plurality overcaps by inserting each of the plurality of decorated films into a mold with a top side of the decorated film adjacent to a wall of the mold; and injecting a polymeric material into the mold to form the overcap, wherein the decorated film is fused into a top surface of the overcap.

One additional aspect of the invention includes a method of establishing traceability of the contents of a medicament container, the method comprising the steps of: storing in a memory device an unalterable character string, the character string being uniquely associated with the memory device; and attaching the memory device to the container substantially concurrently with filling the container with the contents, wherein the filled container is thereafter exposed to sterilization, and wherein the memory device remains fully functional after the container is exposed to sterilization.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
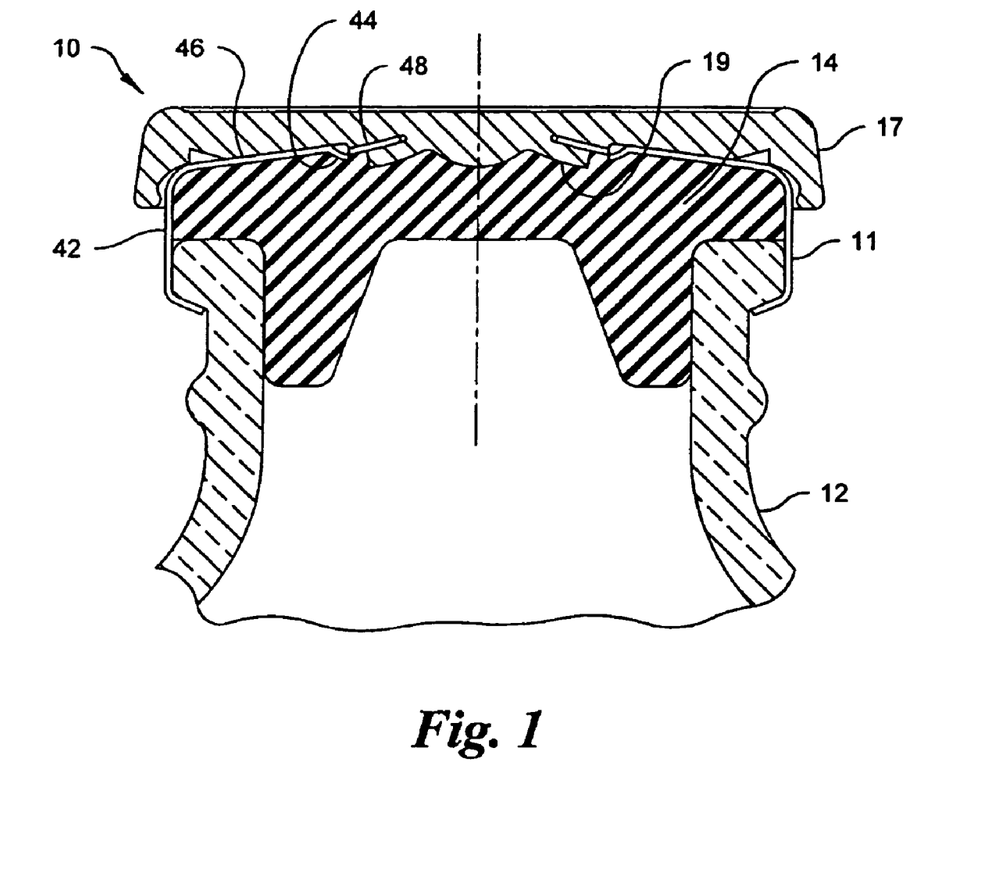
FIG. 1 is a cross sectional view of a preferred embodiment of a closure comprising an overcap and a cap seal attached to a container.

Referring to the drawings, wherein like numerals are used to indicate like elements throughout the several figures and the use of the indefinite article "a" may indicate a quantity of one, or more than one of an element, there is shown in FIG. 1 a preferred embodiment of a closure 10 attached to a container 12. The closure 10 has its best use for closing a glass, vial-like container 12 sealed with a stopper 14 and containing a medicament, but is equally suitable for closing other types of containers 12 such as those made of a polymeric material, including flexible bags filled with materials for which sanitary conditions must be maintained at the opening of the container 12, and/or where traceability/authentication of the contents of the container 12 is required and/or where it is required to provide a positive indication that the closure 10 has been opened.

Figure 3:
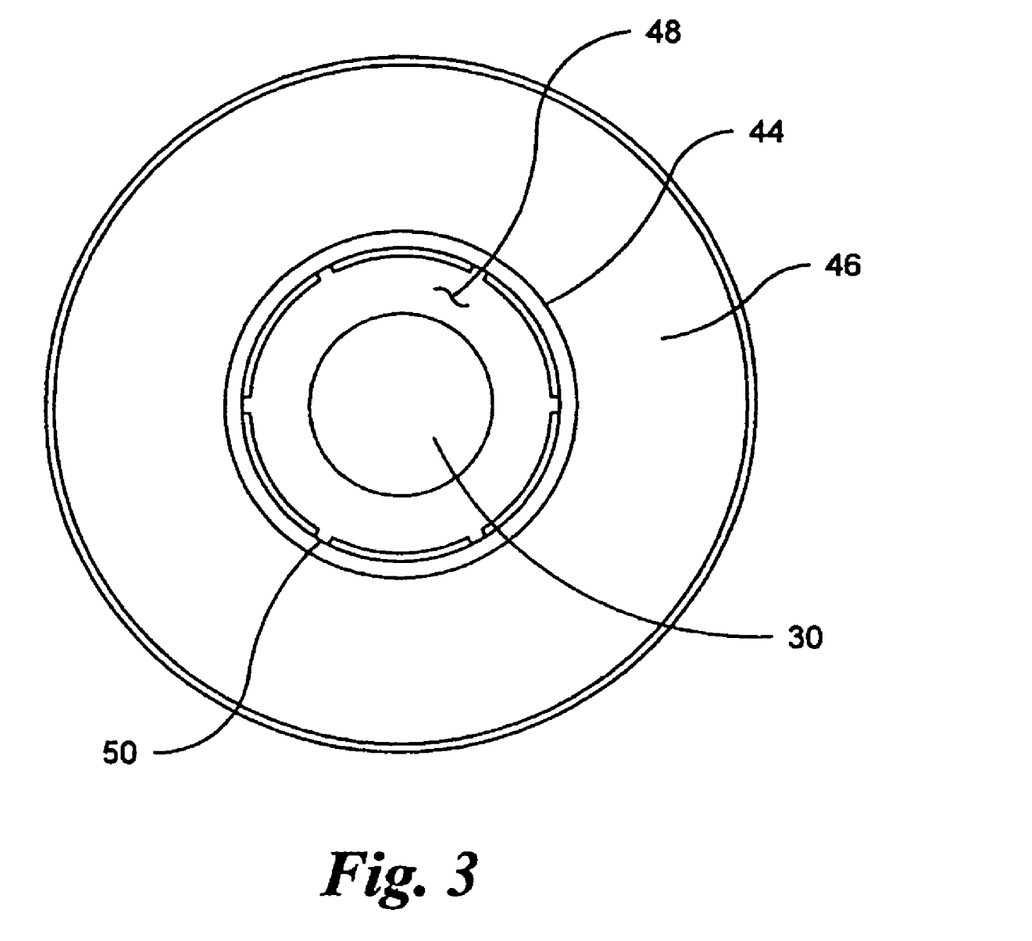
FIG. 3 is a plan view of the cap seal shown in FIG. 1

The closure 10 comprises a cap seal 11 having a removably attached overcap 17. The cap seal 11 has an outer dependent skirt 42 for attachment to the container 12. A recessed lip 44 is formed on an inner terminal edge of a shoulder portion 46 of the cap seal 11. Preferably, an annular center section 48 having a centrally located hole 30, is attached to the recessed lip 44 by a plurality of spaced apart bridges 50 (FIG. 3). The bridges 50 are preferably tapered, narrowing in a radial direction, so that when the annular center section 48 is removed from the recessed lip 44, (see below) the bridges 50 are also removed from the recessed lip 44. The cap seal 11 is substantially the same as the closure described in U.S. Pat. No. 5,152,413, entitled Metal Overcap for Pharmaceutical and Similar Containers, the contents of which are incorporated herein by reference in their entirety. Alternatively, the annular center section 48 may be integral with the recessed lip 44 with a circular scoring being applied around the perimeter of the annular center section in order to facilitate removal of the annular center section 48 from the recessed lip 44.

Figure 2A:
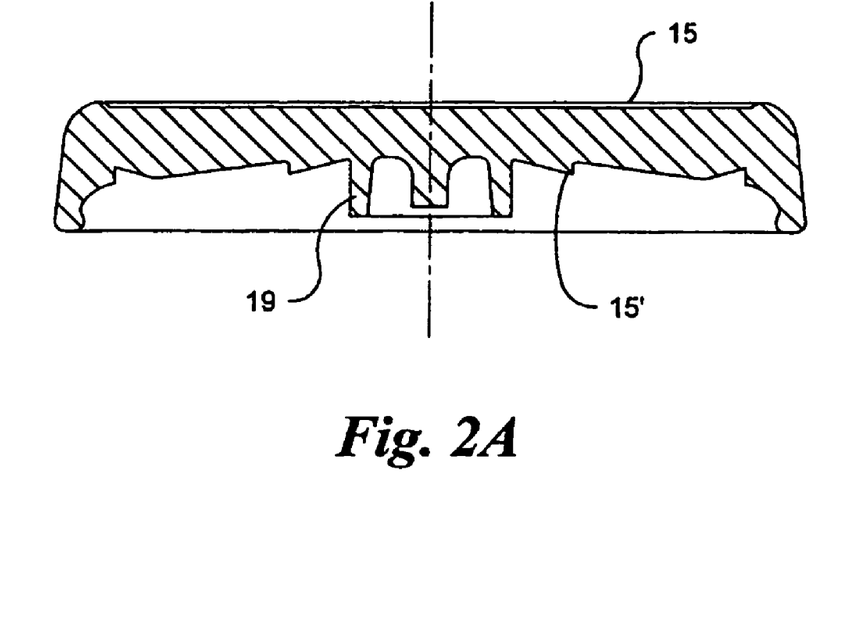
FIG. 2A is a cross sectional view of a preferred embodiment of the overcap shown in FIG. 1 prior to being fastened to the cap seal shown in FIG. 1.
Figure 2B:
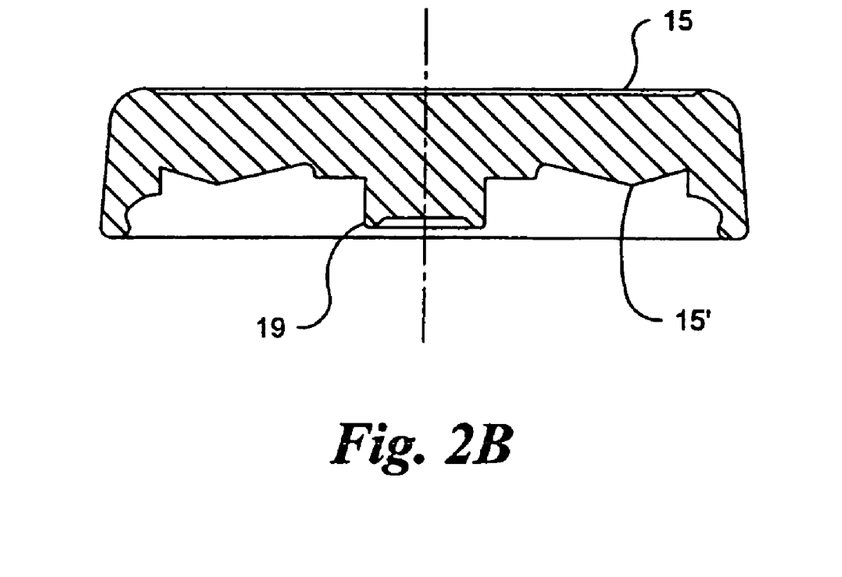
FIG. 2B is a cross sectional view of an alternate embodiment of the overcap shown in FIG. 1.

The overcap 17, (FIGS. 2A and 2B), is a button-like member having a generally flat top surface 15 formed or molded from a polymeric material such as polypropylene or other similar plastic. A projection 19, in the form of an annular dependent ring (FIG. 2A), depends from a bottom surface 15' of the overcap 17. Alternatively, the projection may be a solid post as shown in FIG. 2B. The projection 19 is sized to fit within the center hole 30 of the cap seal 11. During assembly of the overcap 17 to the cap seal 11, (FIG. 1) the projection 19 is staked such that the projection 19 is spread over the annular center section 48, thereby causing the overcap 17 to be fastened to the cap seal 11. The overcap 17 is removable from the cap seal 11 by pressing upward against the edge of the overcap 17. When the overcap is removed, the spaced apart bridges 50 (or the scoring) holding the annular center section 48 to the cap seal 11 fracture. Consequently, the annular center section 48 remains with the overcap 17 when the overcap 17 is removed from the cap seal 11. This prevents the overcap 17 from being replaced on the cap seal 11 once it is removed.

Preferably, the overcap 17 incorporates a decorated film 16 (FIGS. 4 and 5) fused into its top surface 15 such that a top side 24 of the decorated film 16 is visible. Preferably, the decorated film 16 is fused into the top surface 15, using one of the methods of described in U.S. Pat. No. 6,544,634 ('634), entitled Graphic Image Fusion, issued Apr. 8, 2003, the contents of which are incorporated herein by reference in their entirety. However, other methods for fusing the decorated film 16 into the overcap 17 may be used.

In the preferred embodiment, the decorated film 16 is fabricated from a substrate 34. Preferably, the substrate 34 is a printable sheet of not greater than ten mils thickness, of a type that can survive a tortuous injection molding environment, which is un-moldable with a wide variety of thermoplastic and thermosetting materials and which can survive autoclaving when fused into the overcap 17. One such type of material is a silica filled micro-porous sheet material. Preferably, the substrate 34 is PPG Industries MIST ® ten mil thick material as described in the '634 patent. However, other precipitated silica filled micro-porous sheet materials may be used.

Figure 6:
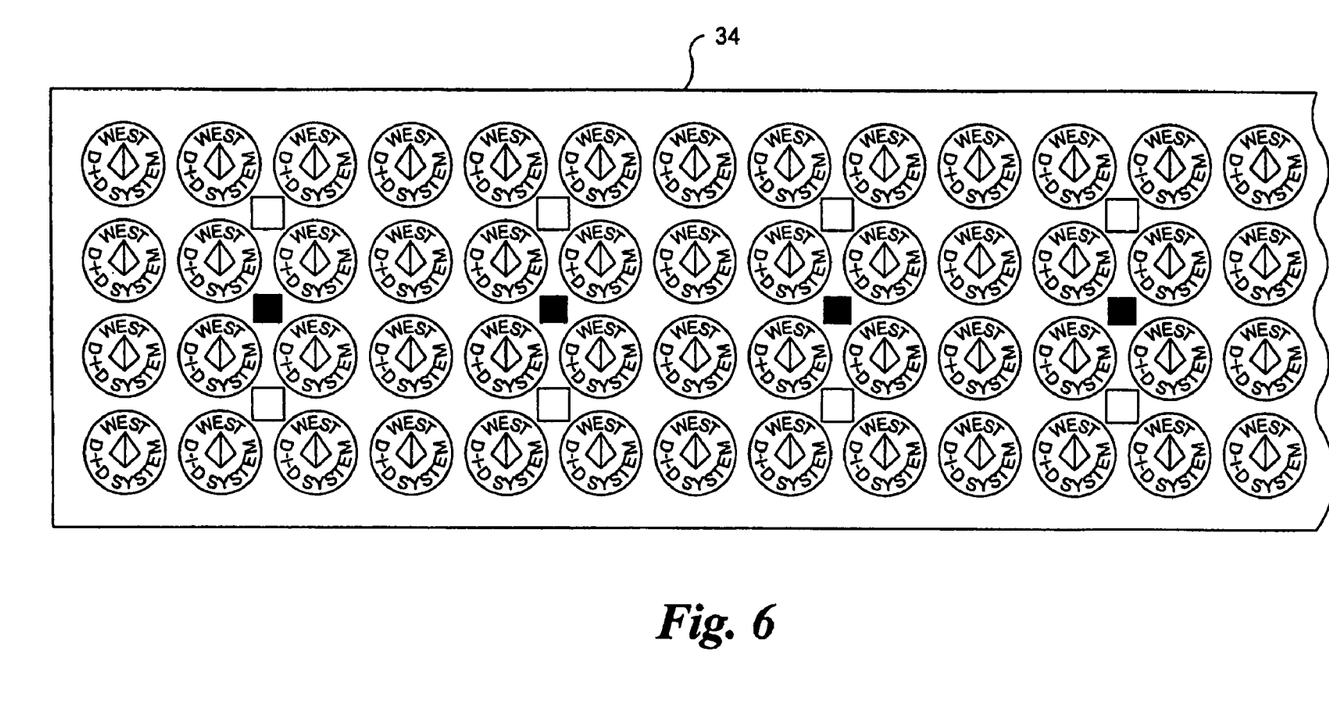
FIG. 6 is a plan view of a preferred embodiment of a substrate on which there are formed a plurality of arrangements of images.

In the preferred embodiment, the decorated films 16 are formed by printing a plurality of arrangements 40 of one or more images 18 on the top side 24 of the substrate 34 (FIG. 6) and attaching a plurality of memory devices 28 on a bottom side 24' of the substrate 34 (not shown), such that each one of the arrangements 40 is aligned on the substrate 34 with a corresponding memory device 28. Preferably, the memory device 28 is attached to the substrate 34 by an adhesive. However, portions of the device 28 may be printed on the substrate 34. While it is preferable that each decorated film 16 include one or more of the images 18 and the memory device 28, the decorated film 16 may include only the images 18 or only the memory device 28 and still be within the sprit and scope of the invention.

Preferably, each one of the decorated films 16 is formed by removing each of the aligned arrangements 40 and its corresponding memory device 28 from the substrate 34 by a standard punching process. Preferably, each decorated film 16 is then inserted into a mold with the top side 24 of the decorated film 16 being adjacent to a wall of the mold. A polymeric material is then injected into the mold to form the overcap 17. Consequently, by virtue of the decorated film 16 being completely encased within (i.e. fused) the polymeric material of the overcap 17, the decorated film 16 is able to maintain legibility of the images 18 after being exposed to autoclaving, radiation such as gamma radiation or e-beam radiation, ethylene oxide gas or deep freezing. In one embodiment, the decorated film 16 is held against the wall of the mold by an electrostatic charge during the process of injecting the polymeric material into the mold.

Figure 5:
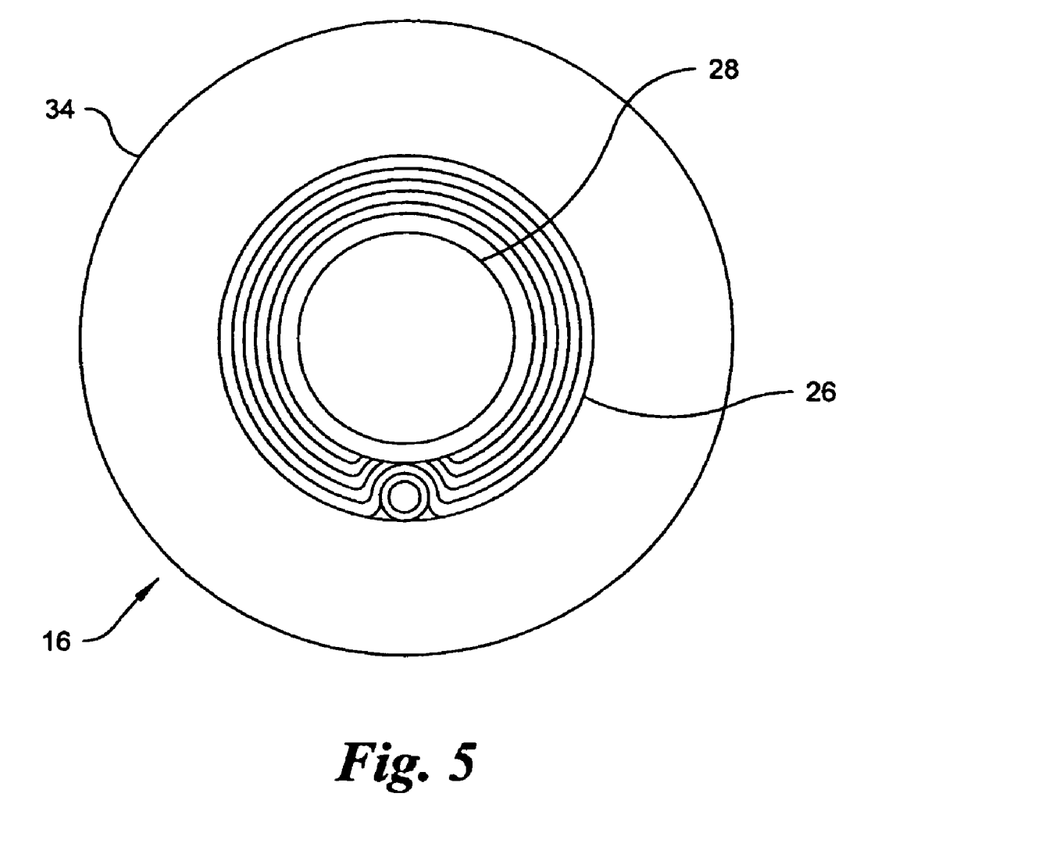
FIG. 5 is a plan view of the bottom side of the preferred embodiment of the decorated film.

The memory device 28 may be any type of device which is capable of permanently storing data, which may be wirelessly read and which is capable of full functionality after being exposed to autoclaving or deep freezing when integrated into the closure 10. Such devices may include, for example, magnetostrictive, magnetic, and passive resonant tags. In the preferred embodiment the memory device 28 is a radio frequency identification device (RFID) integrated circuit 28 and an associated antenna 26 (FIG. 5). Preferably, the antenna 26 is a planar antenna. Preferably, the RFID integrated circuit 28 and the antenna 26 are bonded to the substrate 34 of the decorated film 16 using a high temperature epoxy adhesive. However, other types adhesives or sealants and other methods for bonding, such as welding, may be used. Alternatively, the antenna 26 could be printed onto the substrate 34.

In the preferred embodiment, the RFID integrated circuit 28 comprises 96 bits of memory, a portion of which is read-only memory. While it is preferred that the RFID include 96 bits of memory, the RFID could include as much as 3000 or more bits of memory. Preferably, the read-only portion of each RFID 28 is utilized for storing a character string unique to each RFID integrated circuit 28 (i.e. each overcap 17). The unique character string can not be changed by ordinary means. Consequently, when the overcap 17 is attached to the container 12, a unique serial becomes associated with the container 12. Additional information may be included in those portions of the memory which is not used for storing the unique character string. The additional information may be added and all the stored information may be wirelessly read either prior to or after molding the overcap 17 and at locations along the package and the product supply chain. Information stored in the RFID 28 may include but is not limited to: a custom serial number, a covert or forensic identifier, a specific package number, a manufacturing date, a manufacturing location, a product code, a customer code, a product fill date, a product expiration date, a manufacturing/filling location, a ship to location, a verify receipt, a verify dispensing date, a verify customer, a verify dose compliance and a verify product integrity. The information may be directly interpretable by the interrogating device or may be linkable to a database for interpretation.

Preferably, the images 18 in each one of the arrangement of images 40 are formed in layers, one over the other. However, each arrangement of the images 40 may be formed of images 18 in a single layer or may be a combination of layered and side-by-side images 18. The images 18 may be formed using lithography or similar processes such as screen printing, flexography, gravure, high resolution ink-jet printing and color or monochrome laser printing and may be of a variety of colors. Selected ones of the images 18 may also be formed of magnetic ink and be electrically readable.

An individual image 18 may be visible or invisible to the naked eye when viewed in light having a spectra which is substantially that of daylight. Where an image 18 is invisible to the naked eye in daylight spectra, the image may be made visible by illuminating the image 18 with radiation having a predetermined wavelength, such as ultra-violet radiation. Radiation of other wavelengths such as infra-red radiation or radiation having wavelengths in the radio and x-ray portions of the electromagnetic spectrum may also be used.

Figure 4:
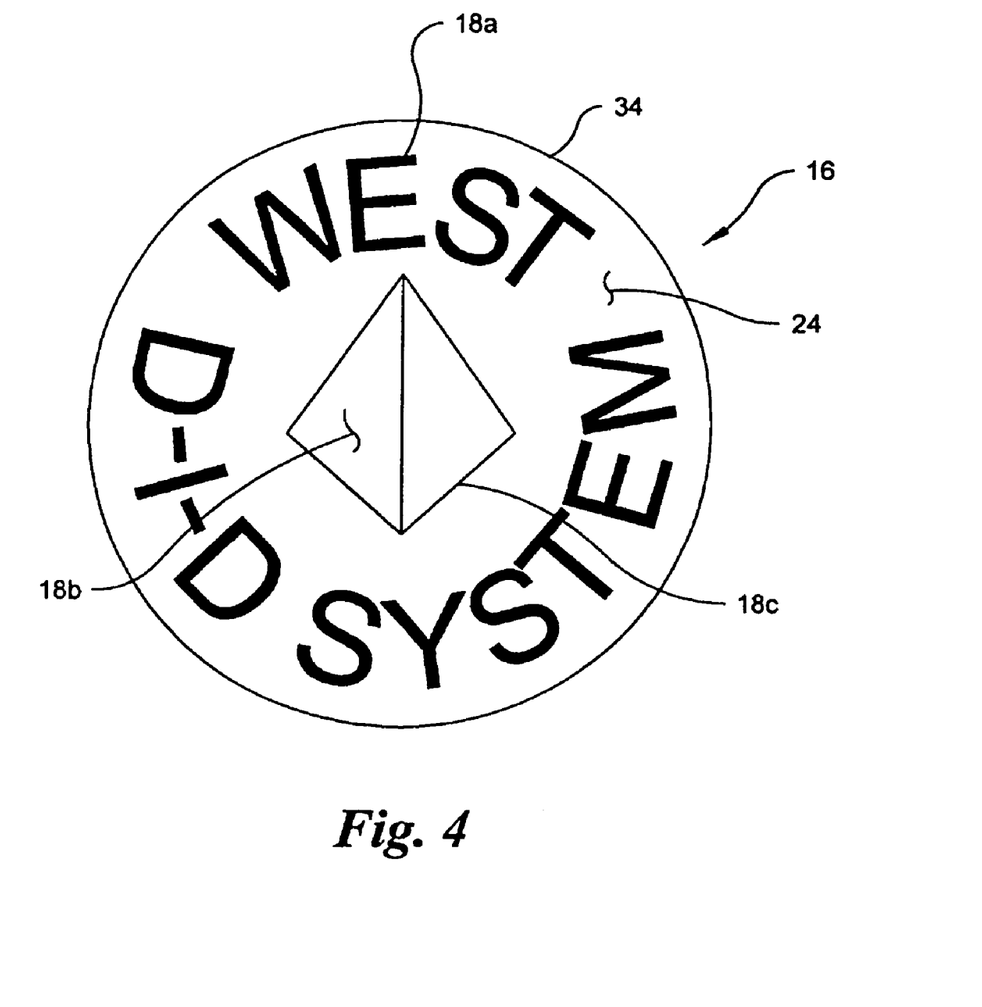
FIG. 4 is a plan view of the top side of a preferred embodiment of a decorated film.

Preferably, the film 16 includes at least one image which is visible when illuminated with light having a spectra which is substantially that of daylight and at least one image which is invisible when illuminated with light having a spectra which is substantially that of daylight. An example of a decorated film 16 having a topmost layer of a visible image 18a and a second layer under the first layer having an invisible image 18b is shown in FIG. 4. The visible image 18a consists of an opaque region including visible identifying indicia and a window 18c, which is transparent to visible and to ultra-violet light, and through which the invisible image 18b may be seen by illuminating the window 18c with ultra-violet light. As would be understood by those skilled in the art, the film 16, the layers having visible and invisible images 18 may be in any quantity and in any order.

An image 18, either visible or invisible, may comprise any type of image which may be printed, including a solid color which may be black, white or transparent, textual, graphical, photographic and biometric images. In particular, photographic or biometric types of images such as landscapes, fingerprints, iris scans etc., having a large amount of near random detail which is difficult to duplicate, can be printed on the decorated film 16 to create covert information for anti-counterfeiting or other purposes.

The overcap 17 is particularly suited for providing a high level of confidence that the labeling on a container 12 reflects the actual contents of the container 12, and that the container 12 was filled by the manufacturer identified on the label on the container 12 by establishing traceability of the contents of the container 12 by: storing in a memory device 28 an unalterable character string, where the character string is uniquely associated with the memory device 28, filling the 12, and attaching the memory device 28 to the container 12 substantially concurrently with filling the 12. Thus by attaching the memory device 18 with a unique character string and other information to the container 12 in the same time frame that the container 12 is filled, the likelihood is minimized of improperly recording in the memory device 18 the contents of the container 12 and the origin of the contents. Further, by reading the character string and/or other data from the memory device 28 and the indicia 18 from the overcap 17, a label may be prepared at the time of determining the ultimate destination of the container 12, without having to determine the contents of the container 12 analytically.

Containers which have been closed with the closure 10 may be exposed to sterilizing by autoclaving, e-beam radiation, gamma radiation, and ethylene oxide gas and to long term storage at freezing temperatures. In the preferred embodiment, the materials selected for the overcap 17 and the cap seal 11 are resistant to sterilizing the contents of the container 12 by autoclaving and gamma rays. Also, each one of the images 18 remains legible and the memory device remains fully functional after exposure to autoclaving at a temperature of 121 degrees Celsius for twenty minutes, and to exposure to temperatures of minus 80 degrees Celsius for periods of at least one month. Preferably, each one of the images 18 remains legible and the memory device remains fully functional after exposure to autoclaving at a temperature of 121 degrees Celsius for at least sixty minutes. Additionally, the images 18 remain legible when exposed to the sterilizing levels of gamma radiation and e-beam radiation. Such sterilizing levels are typically in the range of about 25 kgray.

As would be understood by those skilled in the art, the present invention is adapted to storing information which provides: (1) a high level of confidence that a label on a container 12 reflects the actual contents of the container 12, and (2) a high level of confidence that the container 12 was filled by the manufacturer identified on the label. The method of tagging the container 12 allows for the tagging to be applied substantially concurrently with the filling of the container 12 such that sampling of the containers 12 in a shelved lot is unnecessary for authenticating the contents. The claimed overcap also provides for storing information related to not only the container 12 contents, but also information related to packaging and distribution of the individual containers. 12 Also, selected information is concealed from a casual observer and may be made difficult to replicate, thus providing a measure of protection from counterfeiting.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An overcap for a container comprising:
    a button-like member having a generally flat top surface; and
    a decorated film fused into the top surface, said decorated film including at least one first image on a top side of the decorated film in a top layer; and
    a second image in a layer under the top layer which is visible only while being illuminated with radiation having a predetermined wavelength which is outside the spectral range of daylight.

2. The overcap of claim 1, wherein the decorated film comprises a silica filled micro-porous substrate.

3. The overcap of claim 1, wherein the at least one first image is visible to the naked eye when illuminated with light having a spectra which is substantially that of daylight.

4. The overcap of claim 3, wherein the at least one of the first and the second images image is fixed to the top side of the decorated film by a process selected from the group consisting of lithography, gravure, and flexography.

5. The overcap of claim 1, wherein the at least one first image is invisible to the naked eye when illuminated with light having a spectra which is substantially that of daylight.

6. The overcap of claim 5, wherein the at least one invisible second image is made visible to a person by illuminating the image with radiation of a predetermined wavelength.

7. The overcap of claim 1, wherein a portion of the top layer is transparent to radiation of a selected range of wavelengths.

8. The overcap of claim 1, wherein the film includes at least one image which is visible when illuminated with light having a spectra which is substantially that of daylight and at least one image which is invisible when illuminated with light having a spectra which is substantially that of daylight.

9. The overcap of claim 1, wherein the at least one of the first and second images image includes covert information.

10. The overcap of claim 1, further including a memory device attached to a bottom side of the film.

11. The overcap of claim 10, wherein information stored in the memory device may be wirelessly read.

12. The overcap of claim 11, wherein the memory device is a radio frequency identification device.

13. The overcap of claim 11, further including an antenna attached to the bottom side of the film and connected to the memory device.

14. The overcap of claim 13, wherein the memory device and the antenna are attached to the film by an adhesive.

15. The overcap of claim 13, wherein the antenna is printed on the decorated film.

16. The overcap of claim 10, wherein the memory device includes a stored character sequence unique to the memory device, which is capable of being wirelessly read and incapable of being altered.

17. The overcap of claim 10, wherein the memory device attached to the overcap remains fully functional for reading and for writing following exposure to a temperature of about 121 degrees Celsius for at least twenty minutes.

18. The overcap of claim 10, wherein the memory device attached to the overcap remains fully functional for reading and for writing following exposure to a temperature of about minus 80 degrees Celsius for at least one month.

19. The overcap of claim 1, wherein each one of the at least one images is legible following exposure of the overcap to a temperature of about 121 degrees Celsius for at least twenty minutes.

20. The overcap of claim 1, wherein each one of the at least one images is readable following exposure to a temperature of minus 80 degrees Celsius for at least one month.

21. The overcap of claim 1, wherein each one of the at least one images is readable following exposure to a sterilizing method selected from the group consisting of gamma radiation, e-beam radiation and ethylene oxide gas.

22. The overcap of claim 1, wherein the top layer includes an opaque portion including the first image and a window portion through which the second image is visible when illuminated with radiation having the predetermined wavelength.

23. A method of fabricating an overcap for a medicament container comprising the steps of:
    forming a plurality of arrangements of at least one image on a top side of a substrate;
    attaching a plurality of memory devices on a bottom side of the substrate such that the plurality of arrangements and the plurality of memory devices are aligned;
    removing each one of the aligned arrangements and the memory devices from the substrate to form a plurality of decorated films;
    forming a plurality overcaps by inserting each of the plurality of decorated films into a mold with a top side of the decorated film adjacent to a wall of the mold; and
    injecting a polymeric material into the mold to form the overcap, wherein the decorated film is fused into a top surface of the overcap.

24. The method of claim 23, wherein the decorated film is held to the wall of the mold by an electrostatic charge during the step of injecting the polymeric material into the mold.

25. A closure for a container comprising:
    a cap seal having an annular center section; and
    an overcap removably fastened to the cap seal, said overcap having a decorated film fused into a top surface, said overcap including a depending projection adapted to engaging the annular center section, the annular center section separating from the cap seal and remaining with the overcap when the overcap is removed from the cap seal.

26. The closure of claim 25, wherein said overcap includes a decorated film fused into a top surface, the decorated film including at least one image.

27. The closure of claim 26, wherein the at least one image includes an image which is visible to a person when the overcap is illuminated with light having a spectra which is substantially that of daylight and an image which is invisible to a person when the overcap is illuminated with light having a spectra which is substantially that of daylight but is visible with when the overcap is illuminated with radiation of a predetermined wavelength outside the visible spectrum.

28. The closure of claim 26, wherein the decorated film includes at least one image on a top side and an electronic memory device on a bottom side.

29. The closure of claim 28, wherein the electronic memory device is a radio frequency identification device.

30. A method of establishing traceability of the contents of a container, the method comprising the steps of:
    storing in a memory device capable of being wirelessly read, an unalterable character string, the character string being uniquely associated with the memory device; and attaching the memory device to the container substantially concurrently with filling the container with the contents such that the stored character string is uniquely identified with the container, wherein the filled container is thereafter exposed to sterilization, and wherein the memory device remains fully functional after the container is exposed to the sterilization.

31. The method of claim 30, wherein the memory device is a radio frequency identification device.

32. The method of claim 30, further including the step of reading the character string for identifying the contents of the container when preparing a paper label to be applied to the container.

* * * * *